UNITED STATES PATENT OFFICE.

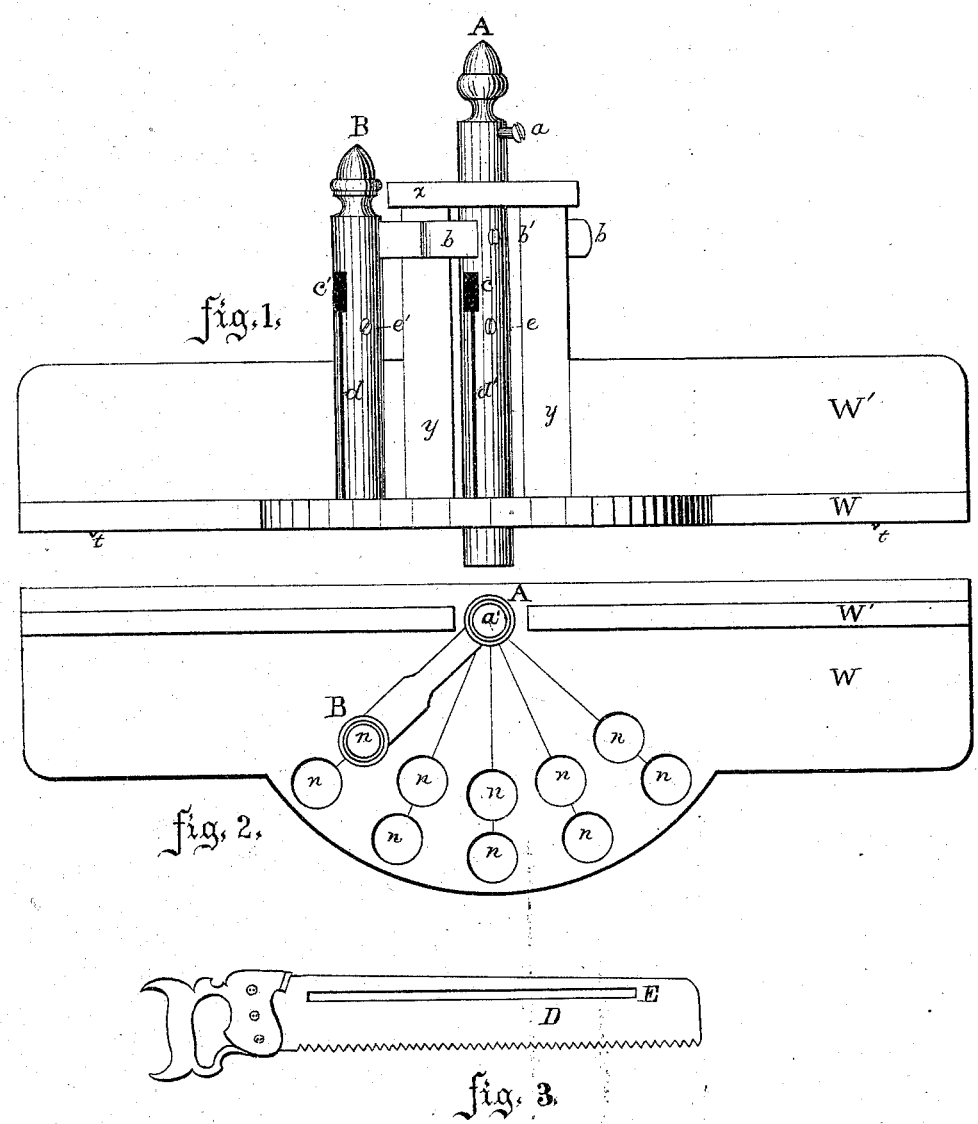

DANIEL BULL, OF AMBOY, ILLINOIS, ASSIGNOR TO HIMSELF AND JAMES H. HOLMES, OF SAME PLACE.

IMPROVEMENT IN MITER-MACHINES.

Specification forming part of Letters Patent No. 140,763, dated July 15, 1873; application filed May 16, 1873.

*To all whom it may concern:*

Be it known that I, DANIEL BULL, of Amboy, in the county of Lee and State of Illinois, have invented an Improvement in Miter-Machines, of which the following is a clear, full, and exact description, reference being had to the accompanying drawings, in which—

Figure 1 represents a front elevation. Fig. 2 represents a horizontal section. Fig. 3 represents the slotted saw to be used.

My invention relates to that class of miter-machines in which the cut of the saw is adjusted and regulated to the work to be done; and it consists in simplifying the machine so as to cheapen it and increase its efficiency by means of construction.

To enable others to understand and use my invention I will proceed to describe the exact manner in which I have carried it out.

From the base W springs the upright standards $y\ y$, secured at their top by the cross-beam X. Through a circular opening in this cross-beam works the vertical shaft A to which is attached the supplemental shaft B by means of the adjustable bar $b$ working in a slot through the shaft A, as shown in Fig. 1. By means of the sliding bar $b$ the distance between shafts A and B may be increased or diminished quickly and easily. The lower end of the shaft A drops through the circular hole $a'$ in the base W, in which hole it revolves as the pivot while the shaft B travels through the arc of a circle in passing along the holes $n\ n$, for a purpose hereinafter described. The distance that the shaft A can drop through the base W at the hole $a'$ is regulated and determined by the adjusting-screw $a$ in the upper portion of the shaft. The shafts A and B are both slotted, as shown at $c\ c'$ and $d\ d'$, the upper slots $c\ c'$ being exactly in the same horizontal line. These slots are made to fit the back of the saw, and it is evident that the cut of the saw while working in these slots must be level, which is an important object to be gained in a miter-machine. By means of the adjusting-screw $a$ the shafts may be allowed to descend, and the saw be allowed to cut any desired depth. But as saws with backs can only be made to cut the depth of their blades, I have added the screws $e\ e'$ to the shafts, which enable me to use the slotted saw D, Fig. 3. By inserting the screws $e\ e'$ through the slot E in the saw D this saw will make the horizontal cut, and can be used to cut any desired depth. Through the base W, and in the arc of two or more circles centering on the main shaft A, I make the holes $n\ n$ at varying angles, as shown in Fig. 1.

It is evident that to use the saw at any desired angle it is only necessary to raise the shaft B from the hole $n$ in which it may be and swing around to the hole on the required angle, and proceed with the work without having to readjust the saw. By the use of three rows of holes a width can be secured which will accommodate any kind of work. The pins $t\ t$ are to prevent the miter from slipping on the bench while being used.

The simple and solid construction of my device not only renders it cheap and efficient and easily handled by any one, but there is no rocking of the saw when in use.

I am aware that miter-machines have been made in which the saw-cut is in a horizontal line, and in which the cut is adjusted and regulated; but these machines have all been complicated, costly, and difficult to use. I therefore do not claim, broadly, the adjustability hereinabove described; but Having fully described my invention, what I claim to be new, and desire to secure by Letters Patent, is—

A miter-machine constructed as described, with the slotted shafts A B working through the holes $a'$ and $n\ n$ in the base W, and connected by the sliding arm $b$, and having the adjusting-screws $a\ b'$ and $e\ e'$, all constructed and arranged substantially as and for the purpose described.

DANIEL BULL.

Witnesses:
CHAS. A. CHURCH,
C. D. VAUGHAN.